US010641905B2

(12) United States Patent
Tuck et al.

(10) Patent No.: US 10,641,905 B2
(45) Date of Patent: May 5, 2020

(54) VELOCITY BIAS COMPENSATION FOR SWIMMER POSITION TRACKING

(71) Applicant: QUALCOMM Incorporated, San Diego, CA (US)

(72) Inventors: David Tuck, San Clemente, CA (US); Michael Koenig, Mission Viejo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 330 days.

(21) Appl. No.: 15/892,442

(22) Filed: Feb. 9, 2018

(65) Prior Publication Data

US 2019/0086552 A1 Mar. 21, 2019

Related U.S. Application Data

(60) Provisional application No. 62/559,437, filed on Sep. 15, 2017.

(51) Int. Cl.
*G01S 19/19* (2010.01)
*G01S 19/40* (2010.01)
(Continued)

(52) U.S. Cl.
CPC ............ *G01S 19/19* (2013.01); *G01P 3/80* (2013.01); *G01P 5/22* (2013.01); *G01S 19/40* (2013.01);
(Continued)

(58) Field of Classification Search
CPC ............ G08B 13/1427; G08B 21/0446; G08B 21/088; G01C 22/00; G01P 3/80;
(Continued)

(56) References Cited

U.S. PATENT DOCUMENTS 8,108,143 B1 *  1/2012  Tester ............... G01C 21/20
                                                    455/456.1
8,125,378 B1 *  2/2012  Jarpenvaa ........... G01S 19/40
                                                    342/357.46
(Continued)

FOREIGN PATENT DOCUMENTS

GB          2497153 A     6/2013

OTHER PUBLICATIONS

Mooney R., et al., "Inertial Sensor Technology for Elite Swimming Performance Analysis: A Systematic Review", MDPI, PMCID: PMC4732051, vol. 16, No. 1, 2015, pp. 1-39, Retrieved from internet on Oct. 2, 2017, https://www.ncbi.nlm.nih.gov/pmc/articles/PMC4732051/.
International Search Report and Written Opinion—PCT/US2018/044268—ISA/EPO—dated Oct. 24, 2018.

*Primary Examiner* — Olumide Ajibade Akonai
(74) *Attorney, Agent, or Firm* — Hunter Clark PLLC

(57) ABSTRACT

Techniques are provided for determining a moving body's position and velocity in the presence of motion of a measuring device relative to the body. For example, a swimmer's position and velocity may be determined by compensating for bias that may result from a swimmer's arm swing. This may help avoid over-estimating a swimmer's velocity that results in inaccurate position estimation along the swimmer's path. To compensate for the swimmer's arm swing, an estimate of translational velocity due to arm rotation may be removed, e.g., from pseudo-range rates (PRRs) from satellite positioning system measurements, to reduce the systematic bias errors. A scale factor is applied to an estimated velocity of the swimmer's body to estimate the velocity of a mobile device on the swimmer's wrist, e.g., while above water.

30 Claims, 8 Drawing Sheets

(51) Int. Cl.
*G01P 3/80* (2006.01)
*G01P 5/22* (2006.01)
*G01S 19/52* (2010.01)
*G01P 5/00* (2006.01)
*G01C 22/00* (2006.01)
*G01S 19/49* (2010.01)
*G01S 19/51* (2010.01)

(52) U.S. Cl.
CPC .............. *G01C 22/00* (2013.01); *G01P 5/00* (2013.01); *G01S 19/49* (2013.01); *G01S 19/51* (2013.01); *G01S 19/52* (2013.01)

(58) Field of Classification Search
CPC .......... G01P 5/22; G01S 13/723; G01S 15/34; G01S 15/46; G01S 19/19; G01S 19/40; G01S 19/51; G01S 19/52; G01S 7/415
See application file for complete search history.

(56) References Cited

U.S. PATENT DOCUMENTS

| | | | |
|---|---|---|---|
| 10,401,504 B2* | 9/2019 | Sugiyama | G06F 3/011 |
| 10,564,288 B2* | 2/2020 | Diggelen | H04L 41/22 |
| 2010/0030482 A1 | 2/2010 | Li | |
| 2011/0084878 A1 | 4/2011 | Riley et al. | |
| 2011/0115670 A1* | 5/2011 | Abraham | G01S 19/235 |
| | | | 342/357.29 |
| 2012/0083705 A1 | 4/2012 | Yuen et al. | |
| 2012/0253486 A1 | 10/2012 | Niemimaki et al. | |
| 2014/0292564 A1 | 10/2014 | Park et al. | |
| 2016/0035229 A1 | 2/2016 | Uchida et al. | |
| 2017/0059601 A1 | 3/2017 | Miller et al. | |
| 2017/0212235 A1* | 7/2017 | Qiu | G01S 15/87 |
| 2017/0357007 A1 | 12/2017 | Miller et al. | |

* cited by examiner

VELOCITY BIAS COMPENSATION FOR SWIMMER POSITION TRACKING

CROSS-REFERENCE TO RELATED APPLICATIONS

This application claims the benefit of U.S. Provisional Application No. 62/559,437, filed Sep. 15, 2017, entitled "VELOCITY BIAS COMPENSATION FOR SWIMMER POSITION TRACKING," the entire contents of which is hereby incorporated herein by reference.

BACKGROUND

It is often desirable to track a location and movement of an object that is in motion. For example, wearables such as smart watches are becoming more popular. These devices are often used to report distance and path traveled by a user while exercising, e.g., swimming, biking, running, etc. A satellite positioning system (SPS) unit in the wearable may be used to track the distance and travel path. It is often desirable to track the distance traveled accurately and to display the particular path traveled accurately. SPS data may also be used to calibrate one or more sensors. For example, SPS data may be treated as accurate and reliable and position and/or velocity values derived from the data used to correct sensor (e.g., accelerometer, gyroscope, etc.) data or to adjust for drift in sensor measurements.

SUMMARY

An example of a mobile device includes: a memory; and processor communicatively coupled to the memory and configured to: obtain a first estimated body velocity; determine a compensated velocity by adjusting the first estimated body velocity to account for a device-to-body motion of the mobile device relative to a body; determine an estimated Doppler value using the compensated velocity and a satellite velocity; and determine a second estimated body velocity based on the estimated Doppler value and a measured Doppler value.

Implementations of such a mobile device may include one or more of the following features. To determine the compensated velocity, the processor is configured to multiply the first estimated body velocity by a scale factor. The processor is configured to determine the compensated velocity of the body in response to a speed of the mobile device being above a threshold. The processor is configured to determine a value of the scale factor based on the speed of the mobile device. The processor is further configured to determine an estimated water current velocity of a water current. The processor is configured to determine the estimated water current velocity by comparing an expected travel distance and an expected travel direction with a measured travel distance and a measured travel direction. The processor is configured to use a default velocity as the first estimated body velocity for an initial determination of the second estimated body velocity, and to use a previously-determined second estimated body velocity for the first estimated body velocity for subsequent determinations of the second estimated body velocity.

An example method includes: obtaining a first estimated body velocity; determining a compensated velocity by adjusting the first estimated body velocity to account for a device-to-body motion of a mobile device relative to a body; determining an estimated Doppler value using the compensated velocity and a satellite velocity; and determining a second estimated body velocity based on the estimated Doppler value and a measured Doppler value.

Implementations of such a method may include one or more of the following features. Determining the compensated velocity includes multiplying the first estimated body velocity by a scale factor. Determining the compensated velocity includes determining whether a speed of the mobile device is above a threshold. Adjusting the first estimated body velocity is performed in response to the speed of the mobile device being above the threshold. The method further includes determining a value of the scale factor based on the speed of the mobile device. The method further includes determining an estimated water current velocity of a water current in which the body is disposed. Determining the estimated water current velocity includes comparing an expected travel distance and an expected travel direction with a measured travel distance and a measured travel direction. Determining the compensated velocity, determining the estimated Doppler value, and determining the second estimated body velocity are all performed by the mobile device. The first estimated body velocity includes a previously-determined second estimated body velocity.

An example of non-transitory, processor-readable storage medium includes processor-readable instructions configured to instruct a processor to: obtain a first estimated body velocity; determine a compensated velocity by adjusting the first estimated body velocity to account for a device-to-body motion of a mobile device relative to a body; determine an estimated Doppler value using the compensated velocity and a satellite velocity; and determine a second estimated body velocity based on the estimated Doppler value and a measured Doppler value.

Implementations of such a storage medium may include one or more of the following features. The instructions configured to instruct the processor to determine the compensated velocity are configured to instruct the processor to multiply the first estimated body velocity by a scale factor. The instructions configured to instruct the processor to determine the estimated velocity of the body are configured to instruct the processor to determine whether a speed of the mobile device is above a threshold. The instructions configured to instruct the processor to determine the compensated velocity include instructions configured to instruct the processor to determine a value of the scale factor based on the speed of the mobile device. The storage medium further includes instructions configured to instruct the processor to determine an estimated water current velocity of a water current. The instructions configured to instruct the processor to determine the estimated water current velocity are configured to instruct the processor to compare an expected travel distance and an expected travel direction with a measured travel distance and a measured travel direction. The instructions configured to instruct the processor to determine the compensated velocity are configured to instruct the processor to use a default velocity as the first estimated body velocity for an initial determination of the second estimated body velocity, and to use a previously-determined second estimated body velocity for the first estimated body velocity for subsequent determinations of the second estimated body velocity.

Another example of a mobile device includes: means for obtaining a first estimated body velocity; means for determining a compensated velocity by adjusting the first estimated body velocity to account for a device-to-body motion of the mobile device relative to a body; means for determining an estimated Doppler value using the compensated velocity and a satellite velocity; and means for determining a second estimated body velocity based on the estimated Doppler value and a measured Doppler value.

Implementations of such a mobile device may include one or more of the following features. The means for determining the compensated velocity are for multiplying the first estimated body velocity by a scale factor. The means for determining the estimated velocity of the body include means for determining whether a speed of the mobile device is above a threshold. The means for determining the compensated velocity include means for determining a value of the scale factor based on the speed of the mobile device. The mobile device further includes means for determining an estimated water current velocity of a water current in which the body is disposed. The means for determining the estimated water current velocity include means for comparing an expected travel distance and an expected travel direction with a measured travel distance and a measured travel direction. The means for obtaining the first estimated body velocity are configured to use a default value as the first estimated body velocity for an initial determination of the second estimated body velocity, and to use a previously-determined value of the second estimated body velocity for the first estimated body velocity for subsequent determinations of the second estimated body velocity.

DETAILED DESCRIPTION

Techniques are discussed herein for determining a moving body's position and velocity. For example, techniques are discussed for determining a swimmer's position and velocity by compensating for bias that may result from a swimmer's arm swing. The techniques discussed may help avoid overestimating a swimmer's velocity that results in inaccurate position estimation along the swimmer's path. To compensate for the swimmer's arm swing, resulting in systematic bias errors in velocity determined from measurements of a device on the swimmer's arm, an estimate of translational velocity due to arm rotation may be removed, e.g., from pseudo-range rates (PRRs) from satellite positioning system measurements, to reduce the systematic bias errors. A scale factor is applied to an estimated velocity of the swimmer's body to estimate the velocity of a mobile device on the swimmer's wrist, e.g., while above water. These techniques are examples, and other techniques may be used.

Figure 1:
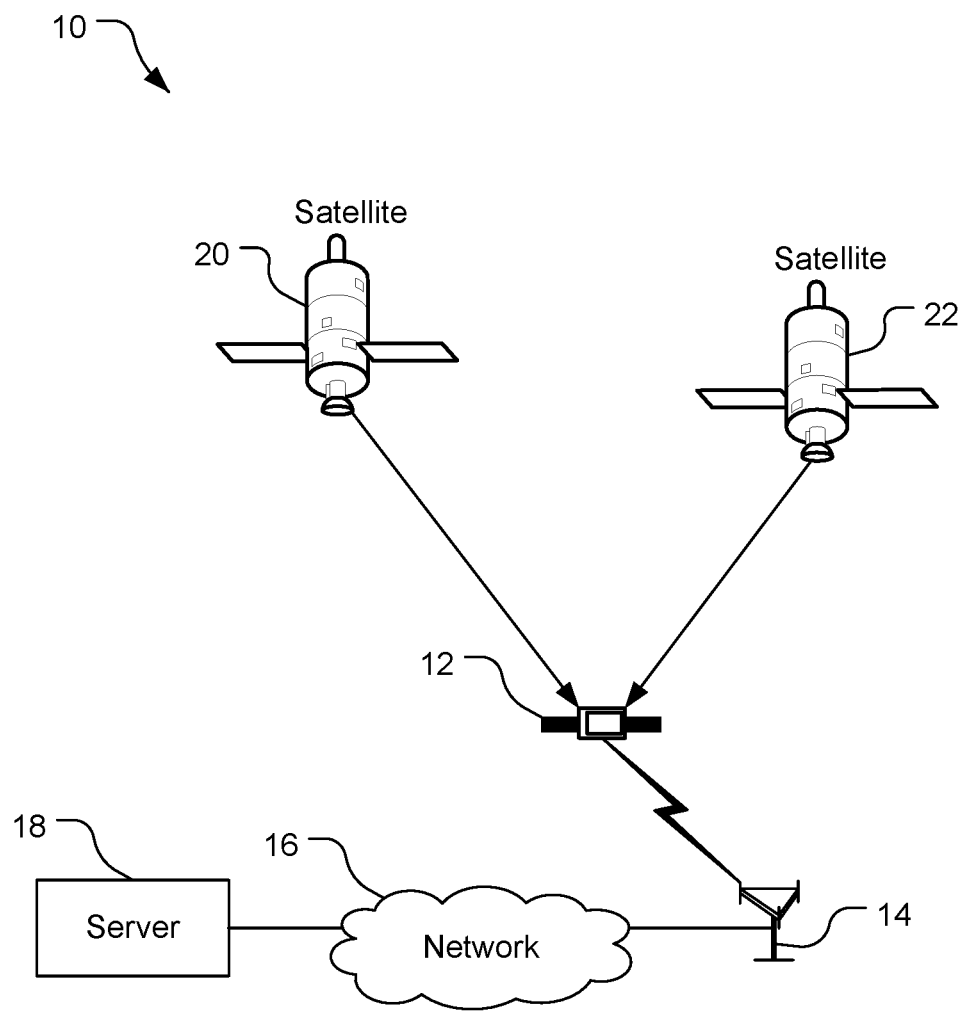
FIG. 1 is a simplified diagram of a communication system.

Referring to FIG. 1, an example of a system 10 capable of providing location and communication services includes a mobile wireless communication device 12 (also referred to herein as a mobile device), a base station 14, a communication network 16, a server 18, and satellites 20, 22. The system 10 is a communication system in that the system 10 can at least send and receive communications between components of the system and a wireless communication system in that the system can send at least some communications wirelessly. For example, communications may be sent wirelessly between the mobile device 12 and the base station 14, communications may be sent between the base station 14 and the network 16, and communications may be sent between the network 16 and the server 18. Wired connections are shown between the base station 14 and the network 16, and between the network 16 and the server 18, although wireless connections may be provided. Positioning signals may be received wirelessly by the mobile device 12. Only one server 18 is shown for simplicity, but more than one server 18 may be used in the system 10, e.g., in various locations to provide quicker access as the system 10 may span large regions, e.g., entire countries or continents, or even the planet. Further, not all components of the system 10 are required to implement one or more features discussed herein. For example, the base station 14 may be omitted and/or the mobile device 12 may not be configured to communicate with the base station 14 (e.g., the mobile device 12 may not include a cellular modem). As another example, the server 18 may be omitted from the system 10, or simply not used, in order to determine compensated speed as discussed herein. Further still, only one base station 14 is shown for simplicity, but numerous base stations are provided for communication with the mobile device 12 as these devices move. Further, only two satellites are shown for simplicity, but numerous satellites are provided for each satellite positioning system (SPS), and multiple SPSs (e.g., Global Positioning System (GPS), Global Navigation Satellite System (GLONASS), BeiDou Navigation Satellite System (BDS), etc.) may be used by the mobile device 12.

The base station 14 is configured to communicate wirelessly with the mobile device 12 via an antenna. The base station 14 may also be referred to by one or more other names such as a base transceiver station, an access point, an access node (AN), a Node B, an evolved Node B (eNB), etc. The base station 14 is configured to communicate wirelessly with the mobile device 12 under control of the server 18 (via the network 16).

The mobile device 12 can be moved to various locations, including into and out of buildings, into and out of water, etc. The mobile device 12 may be referred to as access terminals (ATs), mobile devices, user equipment (UE), or subscriber units. The mobile device 12 shown in FIG. 1 is a smart watch, but other implementations of the mobile device 12 may be used. For example, other types of wearable mobile devices may be used, or other types of mobile devices that are not configured to be wearable by a user may be used.

Figure 2:
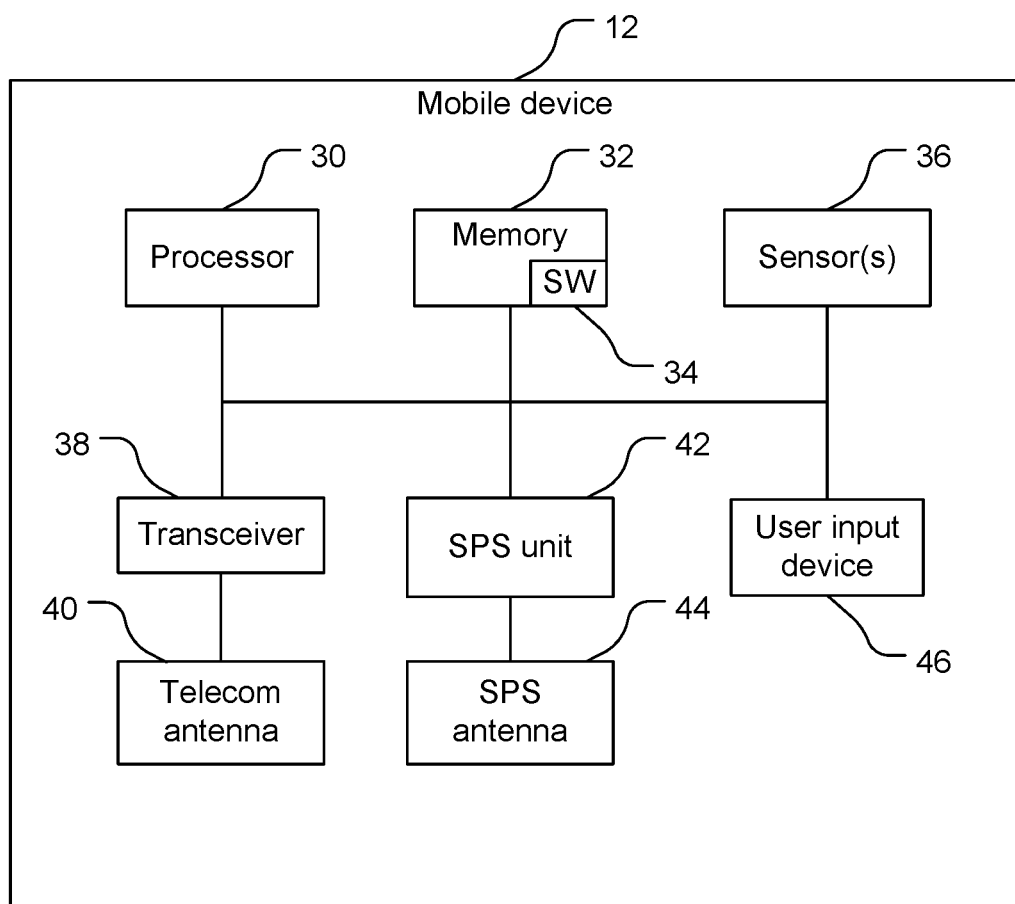
FIG. 2 is a block diagram of portions of a mobile shown in FIG. 1.

Referring also to FIG. 2, the mobile device 12 comprises a computer system including a processor 30, memory 32 including software 34, one or more sensors 36, a transceiver 38, a telecommunication (telecom) antenna 40, a SPS unit 42, a SPS antenna 44, and a user input device 46. The transceiver 38 and the telecom antenna 40 form a wireless communication system (e.g., a cellular communication system including a telecommunication (e.g., cellular signal)

receiver and a telecommunication (e.g., cellular signal) transmitter) that can communicate bi-directionally with the base station 14 (e.g., transmitting and receiving cellular signals). Other example mobile devices may have different configurations, e.g., with multiple transceivers and multiple telecom antennas for communicating with base stations of different cellular networks. The SPS antenna 44 is configured to receive SPS signals, for example raw SPS signals, from the satellites 20, 22 and the SPS unit 42 is configured to process the SPS signals to generate SPS measurements (such as, for example, pseudoranges and pseudorange rates, which can be represented in various ways, including, for example, code phase, rate of change of code phase, carrier phase, rate of change of carrier phase, and/or instantaneous Doppler. The SPS unit 42 may then transfer the SPS measurements to the processor 30, which can then use such measurements to compute such things as positions and/or velocities (including speeds) of the mobile device 12. As such, the processor 30 is configured to receive measurements derived from SPS signals received by the SPS antenna 44 of the SPS unit 42 and compute SPS-based velocities. The processor 30 may determine the SPS-based velocity by assuming a velocity, e.g., zero magnitude velocity, and computing residuals from a Doppler estimate (for the satellite from which the SPS signal was received). The processor 30 may compute residuals from Doppler estimates for multiple satellites. The processor 30 may apply a technique (e.g., a least squares technique or a Kalman filter) that reduces (or even minimizes) a cost function associated with the residuals to determine an estimate of the velocity. Also or alternatively, the processor 30 may determine a speed of the mobile device 12 by processing information (e.g., measurements) from signals received by the telecom antenna 40. The processor 30 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 30 could comprise multiple separate physical entities that can be distributed in the mobile device 12. For example, the processing performed by the SPS unit 42 may be performed wholly or partially by the processor 30. The memory 32 is a non-transitory storage medium that includes random access memory (RAM) and read-only memory (ROM). The memory 32 stores the software 34 which is processor-readable, processor-executable software code containing instructions that are configured to, when executed, instruct the processor 30 to perform various functions described herein (although the description may refer only to the processor 30, or the mobile device 12, performing the functions), for example, the stages and methods described below with reference to FIGS. 9 and 10. Alternatively, the software 34 may not be directly executable by the processor 30 but configured to instruct the processor 30, e.g., when compiled and executed, to perform the functions, for example, the stages and methods described below with reference to FIGS. 9 and 10. The sensor(s) 36 and the user input device 46 are discussed in more detail below.

Figure 3:
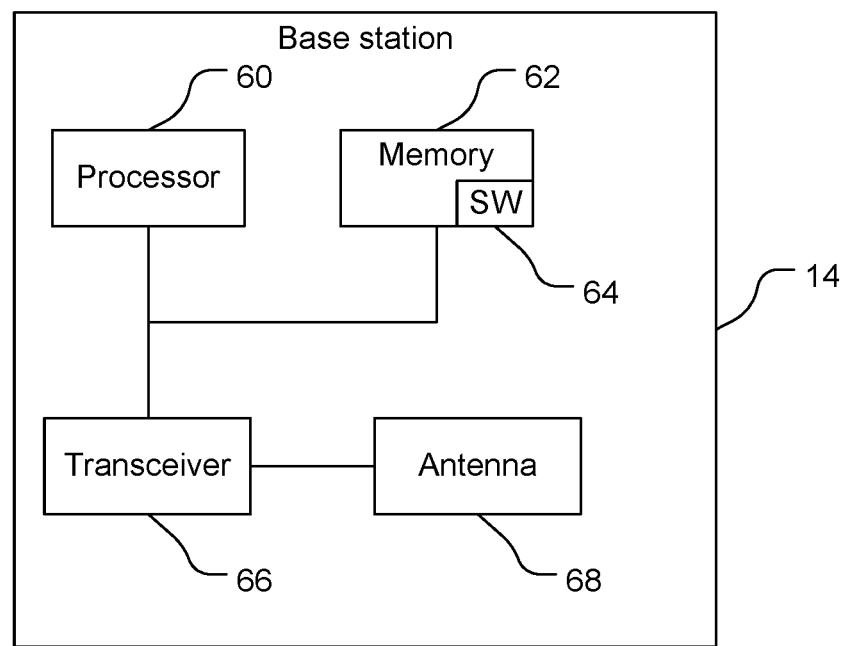
FIG. 3 is a block diagram of portions of a base station shown in FIG. 1.

Referring also to FIG. 3, the base station 14 comprises a computer system including a processor 60, memory 62 including software 64, a transceiver 66, and an antenna 68. While the base station 14 is shown with a single processor 60 and a single memory 62 (with corresponding software 64), the base station 14 may have a processor 60 and a memory 62 (with corresponding software 64) for each sector served by the base station 14, e.g., each of three sectors. The transceiver 66 and the antenna 68 form a wireless communication module configured to communicate bi-directionally with the mobile device 12. The processor 60 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 60 could comprise multiple separate physical entities that can be distributed in the base station 14. The memory 62 is a non-transitory storage medium that includes random access memory (RAM) and read-only memory (ROM). The memory 62 stores the software 64, which is processor-readable, processor-executable software code containing instructions that are configured to, when executed, instruct the processor 60 to perform various functions described herein (although the description may refer only to the processor 60, or the base station 14, performing the functions). Alternatively, the software 64 may not be directly executable by the processor 60, but configured to instruct the processor 60, e.g., when compiled and executed, to perform the functions.

The mobile device 12 and the base station 14 are configured to communicate with each other. The mobile device 12 and the base station 14 can send messages to each other that contain a variety of information. For example, the base station 14 can collect information from the sensor(s) 36 and send the information to the base station 14, e.g., for sending to the server 18.

Figure 4:
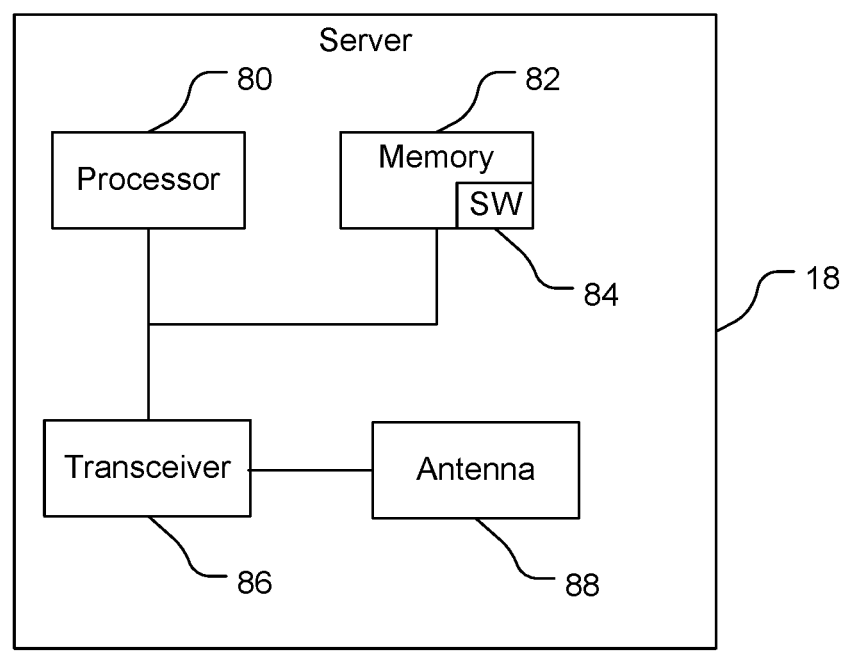
FIG. 4 is a block diagram of portions of a server shown in FIG. 1.

Referring also to FIG. 4, the server 18 comprises a computer system including a processor 80, memory 82 including software 84, and a transceiver 86, and an antenna 88. The processor 80 is preferably an intelligent hardware device, e.g., a central processing unit (CPU) such as those made by QUALCOMM®, ARM®, Intel® Corporation, or AMD®, a microcontroller, an application specific integrated circuit (ASIC), etc. The processor 80 could comprise multiple separate physical entities that can be distributed in the server 18. The memory 82 is a non-transitory storage medium that includes random access memory (RAM) and read-only memory (ROM). The memory 82 stores the software 84, which is processor-readable, processor-executable software code containing instructions that are configured to, when executed, cause the processor 80 to perform various functions described herein (although the description may refer only to the processor 80, or the server 18, performing the functions). Alternatively, the software 84 may not be directly executable by the processor 80, but configured to cause the processor 80, e.g., when compiled and executed, to perform the functions. The transceiver 86 is configured to send communications to and receive communications from the base station 14 through wired connections via the network 16.

Figure 5:
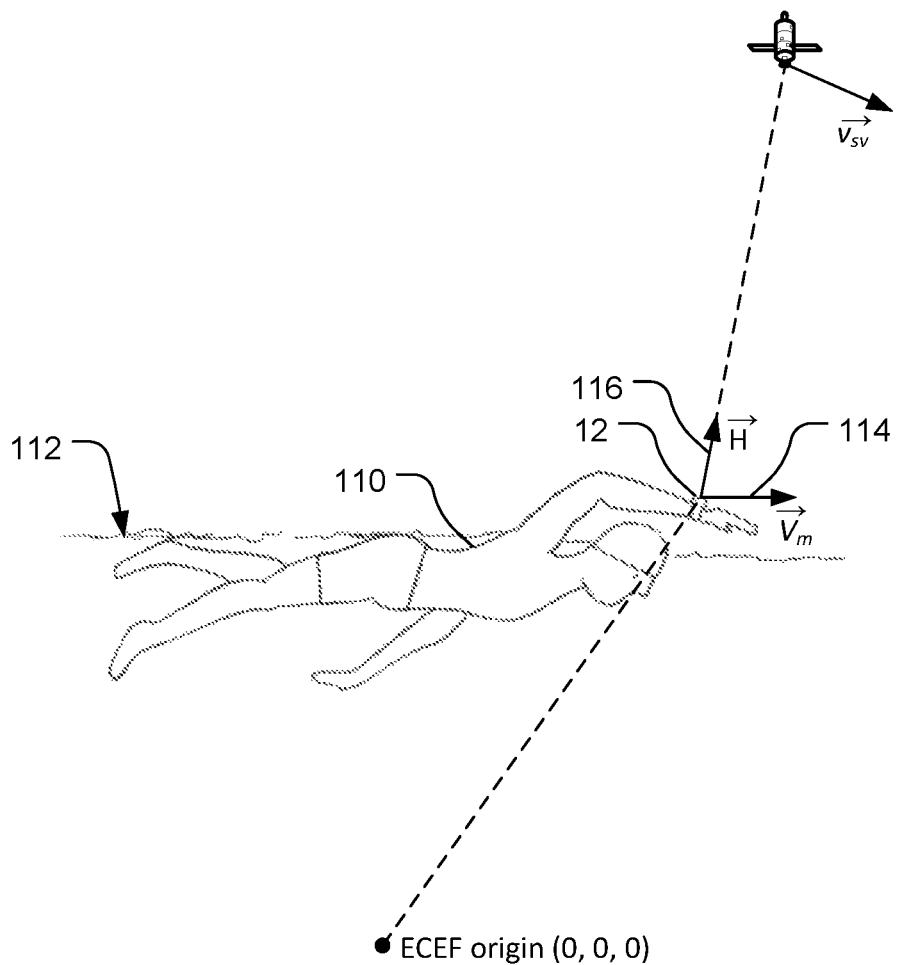
FIG. 5 is a side view of a swimmer wearing a mobile device, with the mobile device being above a water line.
Figure 6:
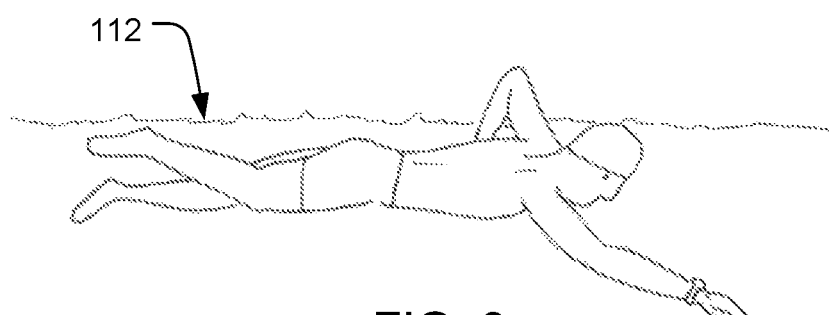
FIG. 6 is a side view of the swimmer shown in FIG. 5, with the mobile device being below the water line.

Referring to FIGS. 5-6, with further reference to FIG. 1, a swimmer 110 is shown swimming a crawl stroke in the presence of at least one of the satellites 22. As shown in FIG. 5, during a portion of the stroke, the mobile device 12 is above (or below but close enough to) a water line 112 and such that the satellite 22 is visible to the mobile device 12. That is, the mobile device 12 can receive sufficient energy from a signal from the satellite to process the signal for position determination when the mobile device 12 is above the water line 112 or when the mobile device 12 is below the water line 112 but receives at least an acquisition threshold amount of energy from the satellite signal. This will generally equate to a threshold depth below the water line 112 below which no satellite signal can be acquired or at least reliably used for position determination. As shown in FIG. 6, during another portion of the stroke, the mobile device 12 is below (or further than the distance from) the water line 112 and thus the satellite 22 is not visible to the mobile device 12. During times that the satellite 22 is visible to the mobile device 12, an arm of the swimmer 110 on which the mobile device 12 resides is rotating and thus the mobile device 12 is typically moving forward, at any instant along and in the direction of a velocity vector 114 ($\vec{V}_m$), at a speed that is faster than a speed of the swimmer 110 overall, e.g., of a torso of the swimmer 110. Herein, reference to speed or velocity of the swimmer 110, unless otherwise noted, is a reference to the torso of the swimmer 110. This differential between the velocity of the mobile device 12 and the velocity of the swimmer 110, and the fact that the detected velocity of the mobile device 12 is on average similar to the direction of the swimmer 110 and faster than the speed of the swimmer 110, will result in a velocity bias being determined for the mobile device 12 relative to the swimmer 110. The bias, if a predictive PVT (Position Velocity Time) filter is used (such as a typical Kalman filter), produces a systematic error in the position and velocity determined for the mobile device 12, as discussed below. The determined position may be overshot and the velocity overestimated without adjusting for the bias. The discussion herein focuses on repetitive motion, e.g., of an arm of the swimmer 110 relative to a body (e.g., a torso) of the swimmer 110, but the techniques discussed herein may be applicable to non-repetitive motion, and thus techniques discussed herein may be used to compensate for repetitive and/or non-repetitive motion, e.g., to compensate determined velocity.

Referring again to FIG. 2, with further reference to FIGS. 1 and 3-4, the sensor 36 may include one or more sensors that may be used to help determine that the mobile device 12 is in water, including to help determine whether the mobile device 12 is below a threshold depth in the water. For simplicity, the use of the plural "sensors" herein includes the singular "sensor," and vice versa. The sensor 36 may obtain and/or produce signals and provide the signals, and/or indications thereof, to the processor 30 for determining whether the mobile device 12 is in water, out of water, below a threshold depth of water, above a threshold depth of water, etc. If the threshold depth is 0 cm (or inches, etc.), then the threshold is the surface of the water and the determination of being deeper than the threshold becomes a determination of being in the water, and a determination of being above the threshold becomes a determination of being out of the water. The determination of the mobile device 12 being below the threshold depth in the water (e.g., below which SPS signals are too weak to be used effectively for ranging/position determination) may be used to trigger operation of the SPS unit 42. Thus, the SPS unit 42 may be operated only when sufficient power is received in one or more signals via the SPS antenna 44 for processing to determine ranging information.

The sensor 36 may include the SPS unit 42 and the SPS antenna 44 although the SPS unit 42 and the SPS antenna 44 are shown separate from the sensor 36 in FIG. 2. The SPS unit 42 and the SPS antenna 44 are configured to receive SPS signals from the satellites 20, 22 (and other satellites not shown). The SPS unit 42 is configured to process these signals, e.g., to identify the satellite(s) 20, 22 from which the signals originated and/or to determine a range to the source satellite(s). For example, the SPS unit 42 may integrate SPS signals over time, perform calculations on the integrated signals, and provide indications of these calculations to the processor 30 for further analysis. For example, the SPS unit 42 may integrate in phase (I) and quadrature phase (Q) SPS signals, square each of these signals, add the squares, and take a square root of the sum. That is, the SPS unit 42 may calculate an I/Q Signal Amplitude according to:

$$I/Q \text{ amplitude} = IQA = \sqrt{I^2 + Q^2} \tag{1}$$

The SPS unit 42 is configured to provide the I/Q signal amplitude IQA over time to the processor 30. For example, referring to FIG. 5, a plot of IQA 100 over time for the mobile device 12 while being worn by a user that is swimming. As shown, the IQA 100 repeatedly swings between a relatively high amplitude and a relatively low amplitude as the user's arm goes in and out of the water with an amplitude 102 being the IQA 100 when the mobile device 12 is at the surface of the water. As shown, the IQA 100 drops significantly with the mobile device 12 in the water, with the IQA 100 being so low that the SPS signal cannot be acquired or at least reliably used for position determination and is essentially nonexistent once the mobile device 12 is less than about 1 cm below the surface of the water. The IQA 100 reported by the SPS unit 42 to the processor 30 may be from one or more of the satellites 20, 22, and/or may be from one satellite constellation from multiple available satellite constellations. For example, the SPS unit 42 may provide the IQA 100 only for a single one of the satellites 20, 22 during a select period of time such as a training period of time. As another example, the SPS unit 42 may provide the IQA 100 only for one or more satellites from one satellite constellation from multiple available constellations such as GPS (used in the United States), GLONASS (Russia's SPS), BDS (China's SPS), etc. Further discussion of use of the IQA 100 by the processor 30 is provided below.

The sensor 36 may include a telecommunication receiver, e.g., a cellular signal receiver, of the transceiver 38. The cellular signal receiver is configured to produce and provide signals indicative of received cellular signals to the processor 30. These signals are referred to as cellular signals, and the processor 30 may analyze these cellular signals for communication purposes and for determining a relationship of the mobile device 12 to water, e.g., under water, a depth under water, etc.

The sensor 36 may include an accelerometer and/or a pressure sensor. The accelerometer is configured to produce signals indicative of acceleration of the mobile device 12 and to provide these signals to the processor 30. The processor 30 may compare accelerometer data with accelerometer data characteristic of swimming, e.g., as stored in the memory 32 or provided by the server 18 or obtained in another manner. If the accelerometer data from the sensor 36 correlates well to the accelerometer data characteristic of swimming, then the processor 30 can conclude that the mobile device 12 is in water (at least during portions of a cycle of the accelerometer data associated with being in water). Similarly, the pressure sensor is configured to measure pressure on the mobile device 12 and to produce signals indicative of pressure on the mobile device 12 and to provide these signals to the processor 30. The processor 30 may be configured to determine that the mobile device is in water based on the measuring of the pressure on the mobile device 12. For example, the processor 30 may determine that the mobile device 12 is in water if the pressure exceeds a threshold pressure such as 1 atmosphere, 1.1 atmospheres, or another pressure threshold.

The user input device 46 is configured to provide an interface to a user and to receive information from the user. The user input device 46 may include, for example, a touch-sensitive screen, a keyboard, a microphone, and/or a data input jack (e.g., a micro-USB jack). The user input device 46 may receive input from the user such as a selection of a smart phone app such as a fitness-tracking app. Further the user input device 46 may receive selections within the app such as an indication that the user is swimming (e.g., that the user is starting a swimming workout indicating that the user is or imminently will be swimming), whether the user is swimming indoors or outdoors, how long of a pool the user will be swimming in, that the user is running, etc.

The SPS unit 42, based on signals received by the SPS antenna 44, is configured to determine position and movement of the mobile device 12. For example, the SPS unit 42 can determine a Doppler shift of a signal received by the SPS antenna 44, and the Doppler shift along with a known velocity of the satellite 22 can be used to determine a velocity of the mobile device 12. If the bias induced by the arm motion of the swimmer 110 relative to the torso of the swimmer 110 can be (at least partially) accounted for, then a compensated velocity of the mobile device 12 will more closely correspond to the velocity of the torso of the swimmer 110 (which may be referred to herein as the velocity of the swimmer 110). In the case of GNSS (Global Navigation Satellite System), the satellite positions are determined in an Earth-fixed frame. Assuming no other sources of error, this implies that any error in the estimated Doppler will be the cumulative effect of any velocity of the user, which in this case means the body-to-water velocity and the arm-to-body velocity (ignoring the water current at present). It is desirable to reduce (e.g., remove) the contribution of the arm-to-body velocity from the Doppler for each of the range-rate measurements to the satellites. This can be done by estimating the arm-to-body velocity directly from the estimated body-to-water velocity, or as a separately filtered parameter. As mentioned above, one or more functions described as being performed by the SPS unit 42 (e.g., a processor of the SPS unit 42) may be performed by the processor 30, and thus the discussion herein refers to the processor 30 performing functions for adjusting for the bias induced by the arm motion of the swimmer 110 and determining position and velocity of the swimmer 110.

Body-to-Earth Velocity, Body-to-Water Velocity, and Water-to-Earth Velocity

Figure 7:
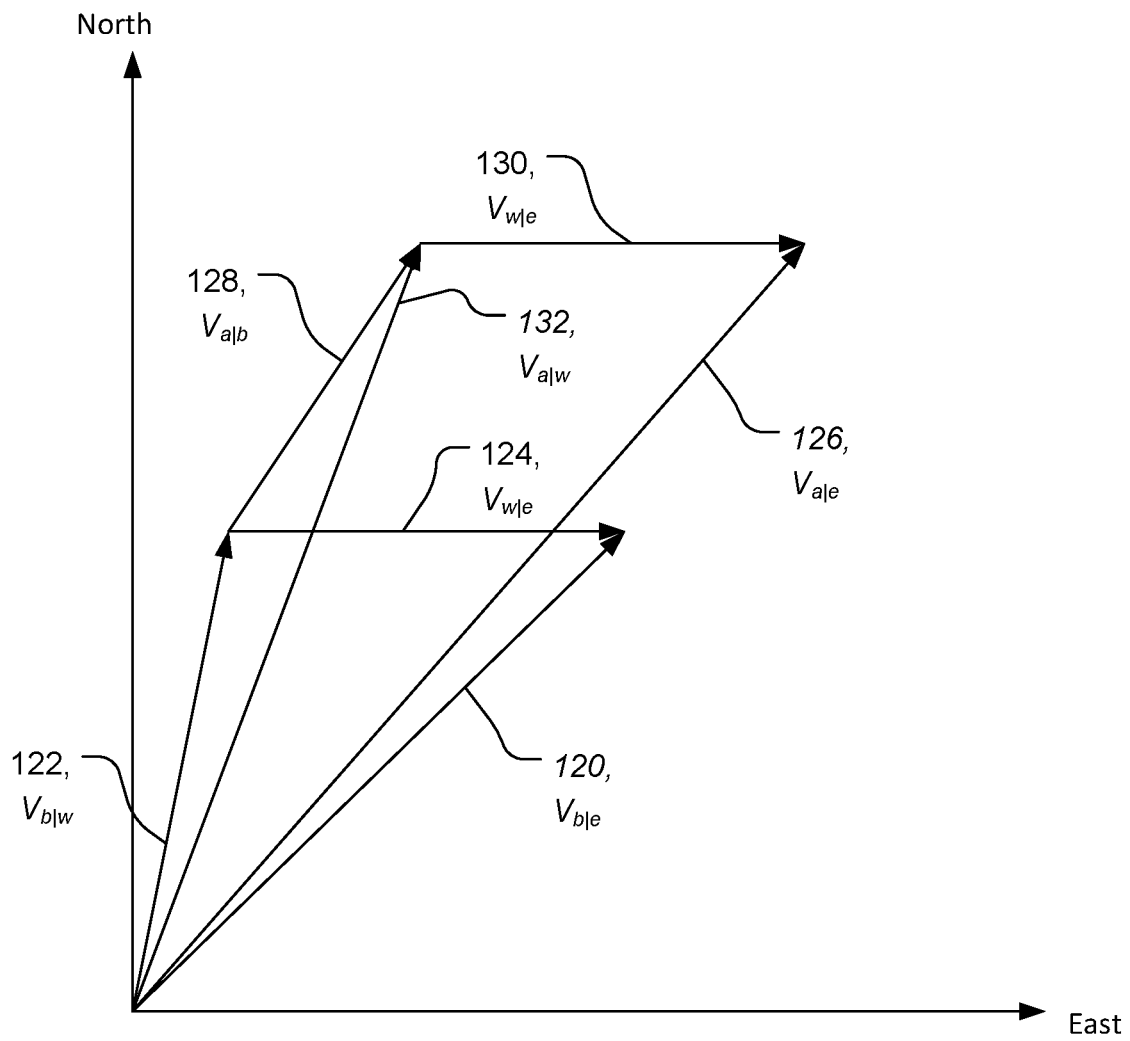
FIG. 7 is a diagram of vectors of expected travel of the swimmer shown in FIG. 5, actual travel of the swimmer shown in FIG. 5, and water current.

It may be desirable to determine a position of the swimmer 110, e.g., relative to the Earth, a body-to-Earth velocity of the swimmer 110, and/or a body-to-water velocity of the swimmer 110. Referring to FIG. 7, a body-to-Earth velocity $V_{b|e}$ is shown as a body-to-Earth vector 120 and is composed of a body-to-water velocity $V_{b|w}$, shown as a body-to-water vector 122, and a water-to-Earth velocity $V_{w|e}$, shown as a water vector 124. In this example, the water-to-Earth velocity $V_{w|e}$ is due east. An arm-to-Earth velocity $V_{a|e}$, shown as an arm-to-Earth vector 126 (with the mobile device 12 on the arm of the swimmer 110) is composed of the body-to-water velocity $V_{b|w}$, (represented by the body-to-water vector 122), an arm-to-body velocity $V_{a|b}$, shown as an arm-to-body vector 128, and the water-to-Earth velocity $V_{w|e}$, shown as a water-to-Earth vector 130 (that has the same magnitude and direction as the water vector 124). As shown, the arm-to-body velocity 128 is not aligned with the body-to-water vector 122 (e.g., the arm moves slightly away from the body as the arm moves forward). An arm-to-water velocity $V_{a|w}$, shown as an arm-to-water vector 132, is composed of the body-to-water velocity $V_{b|w}$ (represented by the body-to-water vector 122), and the arm-to-body velocity $V_{a|b}$, shown as the arm-to-body vector 128. The desirable values of the body-to-Earth velocity $V_{b|e}$ of the swimmer 110 and/or the body-to-water velocity $V_{b|w}$ of the swimmer 110 may be determined from the measurable quantities of the position of the swimmer 110 and the arm-to-Earth velocity $V_{a|e}$ (represented by the arm-to-Earth vector 126) of the swimmer 110 as discussed below. As used herein for velocities and positions, subscripts of a, b, e, w correspond respectively to arm (of the swimmer 110), body (of the swimmer 110, e.g., the torso), Earth, water, a superscript of c indicates that the value corresponds to when a present water speed (current) is non-zero, a character with caret over the character, e.g., $\hat{V}$, indicated an estimated value, and a character with an inverted caret over the character, e.g., $\check{V}$, indicates a measured value. Also, it may be assumed that the position of the swimmer's arm is the same as the position of the swimmer's body.

The processor 30 may be configured to determine a compensated velocity, e.g., compensated for velocity bias, of the swimmer 110 selectively, e.g., only under one or more conditions. For example, the processor 30 may be configured to attempt to determine a velocity of the swimmer 110 adjusted for arm motion only if a speed of the swimmer 110 exceeds a threshold value, for example, 0.2 m/s, 0.3 m/s, 0.6 m/s, or greater, with an activity of swimming selected by a user of the mobile device 12, e.g., using the user input device 46, and with a last-known position of the mobile device 12 being proximate to (e.g., within a threshold distance) of a body of water.

Zero Current and Arm Swing Vector Aligned with Body Travel Vector

Figure 8:
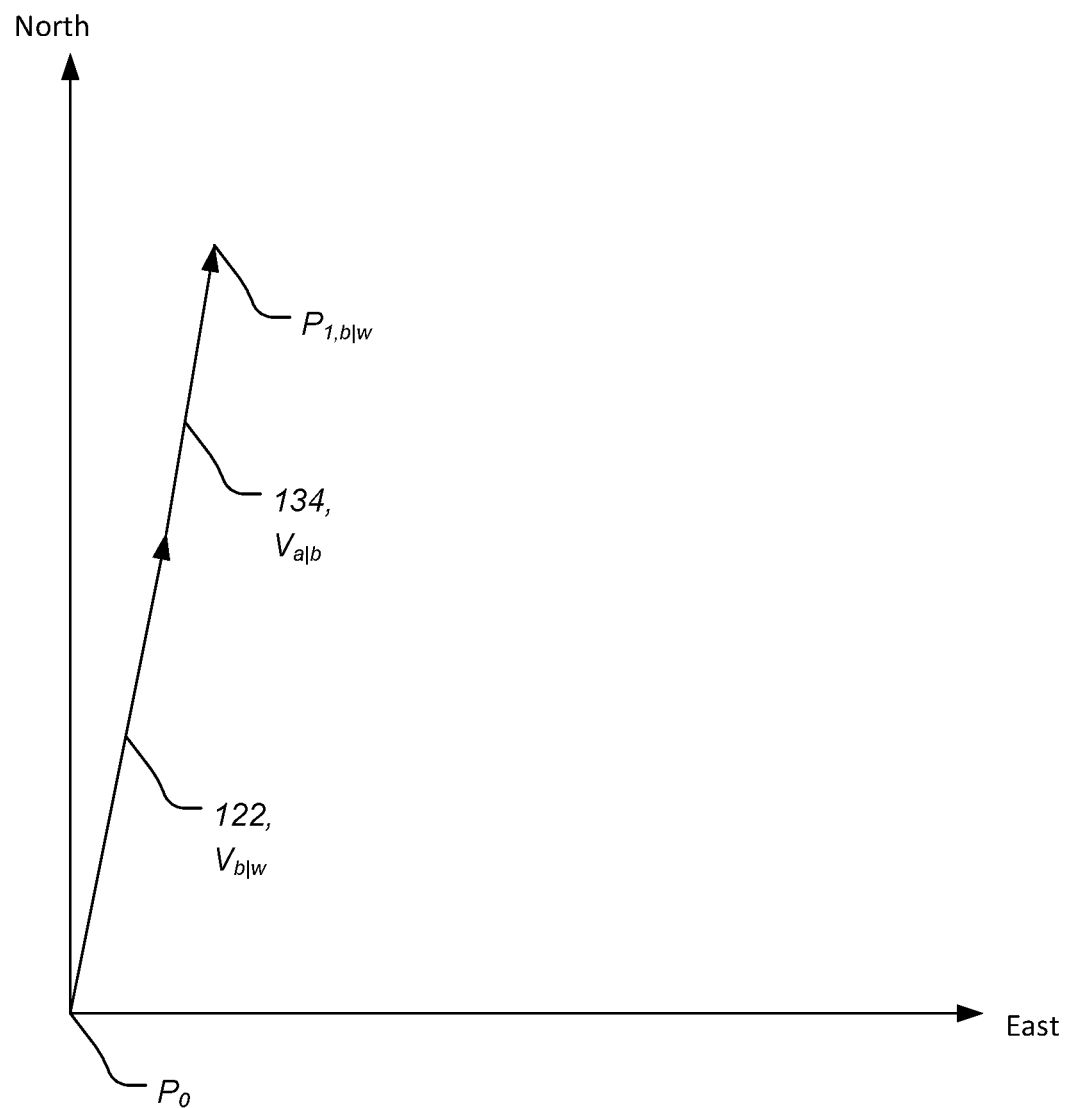
FIG. 8 is a diagram of vectors of body-to-water velocity and arm-to-body velocity in the absence of water current.

Referring to also FIG. 8, if there is no current, e.g., the water-to-Earth vectors 124, 130 shown in FIG. 7 have zero length, and the swimmer's arm swings along a direction of travel of the swimmer 110, then the arm-to-body velocity $V_{a|b}$, shown as an arm-to-body vector 134, is aligned with (in the same direction as) the body-to-water vector 122. In this case, the body-to-water vector 122 is also the body-to-Earth vector, and an arm-to-Earth vector of the arm-to-Earth velocity $V_{a|e}$ will be the sum of the body-to-water vector 122 and the arm-to-body vector 134. To determine the body-to-Earth vector, which is equal to the body-to-water vector 122 in this case, the arm-to-Earth vector can be scaled by a scalar value as discussed below.

The processor 30 is configured to determine a Doppler estimate of a component of relative velocity of the mobile device 12 and the satellite 22 along a direction from the mobile device 12 to the satellite 22. The processor 30 is configured to determine the Doppler estimate including an adjustment for the velocity bias due to the arm swing of the swimmer 110. For example, the processor may be configured to determine the Doppler estimate according to $$D_{est} = (\hat{V}\alpha - v_{SV}) \cdot \vec{H} \tag{2}$$

Where $\hat{V}$ is an estimated velocity of the swimmer 110, α is a scale factor for the arm swing motion (i.e., to scale the velocity of the swimmer 110 to the velocity of the mobile device 12), $v_{SV}$ is the satellite vehicle velocity, $\vec{H}$ is a unit vector 116 (FIG. 5) in the direction from the mobile device 12 to the satellite 22, and "·" is the dot-product matrix operation. The estimated swimmer velocity $\hat{V}$ may, for example, be a chosen value such as a default value (e.g., zero), or another value such as a most-recently-determined (according to the discussion herein) value of the swimmer's velocity. $\hat{V}\alpha$ is an estimate of the velocity $\vec{V}_m$ of the mobile device 12, e.g., as shown in FIG. 5. All velocity values and the unit vector $\vec{H}$ are in an ECEF (Earth-Centered Earth-Fixed) coordinate system, i.e., relative to the center of Earth. Further, the swimmer's velocity is assumed to be horizontal only. The satellite vehicle velocity $v_{SV}$ is a vector of satellite velocity in the ECEF coordinate frame as determined by decoding ephemeris data from the satellite 22 and given by $$v_{SV} = v_{SV}[0], v_{SV}[1], v_{SV}[2] \quad (3)$$

where $v_{SV}[0]$ is the x-component of the velocity, $v_{SV}[1]$ is the y-component of the velocity, and $v_{SV}[2]$ is the z-component of the velocity, and the estimated velocity $\hat{V}$ is a vector of swimmer (user) velocity in the ECEF coordinate frame as determined by starting with a velocity assumption (e.g., assuming zero velocity) and computing the residuals from a Doppler estimate. Least squares regression analysis is applied to the residuals to determine an estimate of the velocity. This estimate is then used to determine residuals from a Doppler estimate to determine a revised estimated velocity, with the estimated velocity $\hat{V}$ given by $$\hat{V} = \hat{V}[0], \hat{V}[1], \hat{V}[2] \quad (4)$$

The processor 30 is configured to use a value of the scale factor α based on a motion model that estimates the amount of velocity of the mobile device 12 to remove due to repetitive motion, e.g., arm swing, of the swimmer 110. For example, the processor 30 may remove the component of measured velocity (for example, an SPS-based velocity) that is due to velocity of the mobile device 12 relative to the body of the swimmer 110. The scale factor α may, for example, be a function of measured acceleration and rotation rate of the arm determined from MEMS (micro electro-mechanical systems) accelerometers and gyroscopes. Also or alternatively, α may be determined based on the speed of the mobile device 12, e.g., as one or more functions of speed of the mobile device 12. For example, the processor 30 may be configured to determine α according to the following equations.

$$\text{For } 0.5 \text{ m/s} \leq s < 1.25 \text{ m/s}, \alpha = \text{MIN}(1+(s-0.5), 2) \quad (5)$$

$$\text{For } s \geq 1.25 \text{ m/s}, \alpha = \text{MIN}(1+(s-0.2), 5) \quad (6)$$

where s is the speed of the mobile device 12, e.g., the SPS-based velocity of the mobile device 12, or the speed as determined by another manner (e.g., analysis of telecommunication signals, analysis of sensor (e.g., accelerometer and/or gyroscope) data, etc.). As another example of a technique for determining a value of α, a first-order approximation may be used for the scale factor α such that α=MIN (1+($S_u$−$S_b$), 3), where $S_u$ is the speed of the mobile device 12 in meters per second as determined from signals from the satellites 22, and $S_b$ is an assumed baseline speed. For example, a default value of $S_b$ may be 0.6 as this is a typical speed of an adult swimmer. Alternatively, the value of α may be set to a predefined value such as 2.5. The value of $S_b$ may be adjusted, e.g., based on information provided about the swimmer 110 such as typical speed, arm length, stroke type, time above water per stroke, etc. One or more of these values may be provided by the swimmer 110 (e.g., through the user input device 46 and/or learned by the processor 30). Thus, based on the estimated speed of the swimmer 110 relative to one or more thresholds, the estimated speed and/or the value of the scale factor may be changed. For example, if the estimated speed is below 0.5 m/s, then use of the scale factor may be eliminated, changing the estimated speed. As another example, based on the value of the estimated speed, the value of the scale factor may be changed (e.g., if the value of the scale factor from Equation (6) is used but results in an estimated speed below 1.25 m/s, resulting in the scale factor being determined from Equation (5)). Changing the value of the scale factor may then change the value of the estimated speed. Or, the new value of the scale factor may be used only for future determinations of estimated speed. Still other techniques for determining values of a variable scale factor may be used, e.g., with thresholds other than those discussed, other scale factor values, no thresholds, other formulas, etc.

Alternatively, the processor 30 may be configured to determine a value for the scale factor α using measured velocity, e.g., SPS-based velocity, and position of the mobile device 12. Using the example of FIG. 8, at a first epoch, the mobile device 12 is observed at an initial position $P_0$, and at a measured present position $\check{P}_{1,b|w}$ (that corresponds to a measured present position $\check{P}_{1,b|e}$ given that there is zero current, with the position of the arm relative to the Earth approximately equal to, and assumed equal to, the position of the body relative to the Earth. The value $P_0$ is not indicated as being measured (inverted caret) or estimated/filtered (caret), as this value may be a prior measured position or a prior estimated/filtered position. The processor 30 can compare a distance between these two positions ($\check{P}_{1,b|e}$−$P_0$) with a distance ($\hat{P}_{1,a|w}$−$P_0$), where $\hat{P}_{1,a|w}$ is an estimate of a propagated position of the mobile device 12, to the time of the second epoch, based on an uncompensated measured velocity $\check{V}_{0,a|e}$ for the first epoch. The uncompensated measured velocity $\check{V}_{0,a|e}$ is an SPS-based velocity that comprises a base velocity of a body and a supplemental velocity due to repetitive motion of the mobile device 12 relative to the body. The body may be living (e.g., of a user, a swimmer, another person, a non-human animal) or not living (e.g., a robot). Thus, the base velocity may be the velocity of the swimmer 110 and the supplemental velocity the velocity due to motion of the swimmer's arm on which the mobile device 12 is disposed during a repetitive swim stroke. The scale factor α may be estimated according to $$\hat{\alpha} = \frac{\hat{P}_{1,a|w} - P_0}{\check{P}_{1,b|w} - P_0} = \frac{\hat{P}_{1,a|w} - P_0}{\check{P}_{1,b|w} - P_0} = \frac{\check{V}_{0,a|w} \cdot dt}{\check{P}_{1,b|e} - P_0} = \frac{\check{V}_{0,a|e} \cdot dt}{\check{P}_{1,b|e} - P_0} \quad (7)$$

The scale factor $\hat{\alpha}_1$ may initially come from a model, but eventually be a converged term if the scale factor is a static, or at least stable, term. The (converged) scale factor may be used to reduce position uncertainty resulting from limited accuracy of position fixes, e.g., by incorporating additional, unbiased information from the velocity estimate.

Non-Zero Current with Arm Swing Vector Aligned with Body Travel Vector

To compensate for a non-zero current, the processor 30 can reduce (e.g., remove) a current component and scale the velocity. In this scenario, the processor 30 may estimate a value of the scale factor α according to $$\hat{\alpha} = \frac{\hat{P}_{1,a|w} - P_0}{\check{P}_{1,b|w} - P_0} = \frac{\check{V}_{0,a|w} \cdot dt}{(\check{P}_{1,b|e}^c - \check{V}_{0,w|e}^c \cdot dt) - P_0} = \frac{(\check{V}_{0,a|e}^c - \check{V}_{0,w|e}^c) \cdot dt}{(\check{P}_{1,b|e}^c - \check{V}_{0,w|e}^c \cdot dt) - P_0} \quad (8)$$

Zero Current with Arm Swing Vector not Aligned with Body Travel Vector

The processor 30 may be configured to determine a velocity of the arm relative to the body $\hat{V}_{0,a|b}$. The processor 30 may calculate the effective velocity over two sample periods using equation (9). This calculates the velocity as the quotient of the difference from the measure position $\check{P}_{1,b|e}$ to the initial position $P_0$ and the delta time between epochs. This velocity is compared against the measured velocity at the arm $\check{V}_{0,a|e}$, with the difference being attributable to the velocity of the arm relative to the body $\hat{V}_{0,a|b}$, shown in equation (11). Equation (11) is also valid when there is a non-zero, but constant current, as the water velocity will equally affect both the average estimated velocity $$\frac{(\check{P}_{1,b|e} - P_0)}{dt},$$

and the estimated instantaneous velocity $\hat{V}_{0,a|b}$.

$$\hat{V}_{0,b|e} = \frac{(\check{P}_{1,b|e} - P_0)}{dt} \quad (9)$$

$$\hat{V}_{0,a|b} = \check{V}_{0,a|e} - \hat{V}_{0,b|e} \quad (10)$$

$$\hat{V}_{0,a|b} = \check{V}_{0,a|e} - \frac{(\check{P}_{1,b|e} - P_0)}{dt} \quad (11)$$

Non-Zero Current with Arm Swing Vector not Aligned with Body Travel Vector

With non-zero current and arm swing not aligned with the swimmer's body, a measured position $\check{P}_{1,b|e}^c$ (FIG. 7) of the swimmer 110 relative to the Earth at a second epoch comprises the propagated position of the swimmer's body-to-water velocity $\hat{V}_{0,b|w}$, indicated by the body-to-water vector 122, from the position $P_0$ at the first epoch, plus the propagated distance of the water current based on the water-to-Earth velocity $\hat{V}_{0,w|e}$, indicated by the water-to-Earth vector 124. The measured position $\check{P}_{1,b|e}^c$, the measured arm-to-Earth velocity $\check{V}_{0,a|e}^c$, and the estimated body-to-Earth velocity $\hat{V}_{0,b|e}$ can be represented by $$\check{P}_{1,b|e}^c = P_0 + (\hat{V}_{0,b|w} + \hat{V}_{0,w|e}) \cdot dt \quad (12)$$

$$\check{V}_{0,a|e}^c = \hat{V}_{0,a|b} + \hat{V}_{0,b|w} + \hat{V}_{0,w|e} \quad (13)$$

$$\hat{V}_{o0\ b|e} = \hat{V}_{0,b|w} + \hat{V}_{0,w|e} \quad (14)$$

One or more terms in Equations (12)-(14) may include one or more error terms (not shown), e.g., to account for imprecision in measurement, approximations in estimates, etc. The estimated arm-to-body velocity $\hat{V}_{0,a|b}$ may be estimated using one or more of the sensor(s) 36, or the method described in equation (11). Using this estimated value and the measured arm-to-Earth velocity $\check{V}_{0,a|e}^c$, the estimated body-to-Earth velocity $\hat{V}_{0,b|e}$ may be determined. Other techniques may be used to determine body-to-Earth velocity $\hat{V}_{o,b|e}$, for example, analyzing a change in position for a corresponding change in time using Equation (12).

Unit Vector from Mobile Device to Satellite

The processor 30 may be configured to determine the value of the unit vector $\vec{H}$. For example, the processor 30 may be configured to determine the value of the unit vector $\vec{H}$ according to $$\vec{H} = H[0], H[1], H[2] \quad (12)$$

$$H[0] = \frac{P_{SV}[0] - P_b[0]}{r} \quad (13)$$

$$H[1] = \frac{P_{SV}[1] - P_b[1]}{r} \quad (14)$$

$$H[2] = \frac{P_{SV}[2] - P_b[2]}{r} \quad (15)$$

where r is a distance, or geometric range, from the mobile device 12 to the satellite 22 given by $$R = \sqrt{(P_{SV}[0] - P_b[0])^2 + (P_{SV}[1] - P_b[1])^2 + (P_{SV}[2] - P_b[2])^2} \quad (16)$$

where a mobile device position $P_b$ is a vector of mobile device position in the ECEF coordinate frame as determined by decoding ephemeris data from the satellite 22 and given by $$P_b = P_b[0], P_b[1], P_b[2] \quad (17)$$

where $P_b[0]$ is the x-component of the position, $P_b[1]$ is the y-component of the position, and $P_b[2]$ is the z-component of the position, and where a satellite vehicle position $P_{SV}$ is a vector of satellite position in the ECEF coordinate frame as determined by decoding ephemeris data from the satellite 22 and given by $$P_{SV} = P_{SV}[0], P_{SV}[1], P_{SV}[2] \quad (18)$$

where $P_{SV}[0]$ is the x-component of the position, $P_{SV}[1]$ is the y-component of the position, and $P_{SV}[2]$ is the z-component of the position.

The processor 30 may be configured to obtain an actual, measured Doppler $D_{meas}$ from a signal from the satellite and compare this to the Doppler estimate $D_{est}$ from Equation (2). The processor 30 may receive the measured Doppler $D_{meas}$ from the SPS unit 42 or may calculate the measured Doppler $D_{meas}$ from signal information from the SPS unit 42. The processor 30 may, in response to the uncorrected body-to-Earth speed (i.e., magnitude of the velocity) being above a threshold, apply the scale factor to the velocity used in calculating the Doppler estimate $D_{est}$. Using the scale factor assumes that the arm-to-body vector and the body-to-Earth vector are aligned (e.g., that misalignment has been removed/reduced). The processor 30 may determine a difference between the measured Doppler $D_{meas}$ and the Doppler estimate $D_{est}$, called a residual, and use the residual to determine a new, revised estimate of the swimmer velocity $\hat{V}$ using, for example, a Kalman filter. Correction of clock drift of the mobile device 12 relative to the satellite 22 is performed in accordance with known techniques in determining the measured Doppler $D_{meas}$.

Other Calculations

The processor 30 may be configured to determine a velocity of the water relative to Earth $\hat{V}_{0,w|e}$, i.e., a velocity of a current in the water as an approximation (as other factors could influence the estimate, e.g., a change in stroke (e.g., force, direction, frequency, etc.) by the swimmer 110), or a fluctuating current. There are several methods to do this, such as:

1. $\hat{V}_{0,a|b}$ is solvable given the aforementioned methods, and can be expressed in a localized frame (such as NED). An a priori model can then be used to estimate $\hat{V}_{0,b|w}$ as a function of $\hat{V}_{0,a|b}$, also in the same localized frame. From this estimate of $\hat{V}_{0,a|b}$ (and $\hat{V}_{0,b|w}$) the velocity of the current $\hat{V}_{0,w|e}$ can be estimated from $$\hat{V}_{0,w|e} = \check{V}_{0,a|e} - \hat{V}_{0,a|b} - \hat{V}_{0,b|w} \quad (19)$$

2. The same as method (1) above, $\hat{V}_{0,a|b}$ is solvable, but $\hat{V}_{0,b|w}$ and $\hat{V}_{0,w|e}$ are not separable from only the measurements $\check{P}_{0,a|e}$ and $\check{V}_{0,a|e}$, when the direction of travel is constant (because the water current affects the measurements equally), and assuming no other information is present, such as the model in method (1). In this case, we have the following set of equations:

$$\check{P}_{1,a|e} - P_0 = (\hat{V}_{1,b|w} + \hat{V}_{w|e}) \cdot dt \tag{20}$$

$$\check{P}_{2,a|e} - P_1 = (\hat{V}_{2,b|w} + \hat{V}_{w|e}) \cdot dt \tag{21}$$

$$\check{V}_{1,a|e} - \hat{V}_{1,a|b} = (\hat{V}_{1,b|w} + \hat{V}_{w|e}) \cdot dt \tag{22}$$

$$\check{V}_{2,a|e} = \hat{V}_{2,a|b} + \hat{V}_{2,b|w} + \hat{V}_{w|e} \tag{23}$$

Equations (20) and (21) have three unknowns: $\hat{V}_{1,b|w}$, $\hat{V}_{2,b|w}$, and $\hat{V}_{w|e}$. Equations (22) and (23) introduce two more unknowns: $\hat{V}_{1,a|b}$ and $\hat{V}_{2,a|b}$. These two velocities are distinct in the localized frame because the velocity (specifically direction) of the swimmer 110 is different. These velocities are, however, assumed identical in the frame of the swimmer, that is $\hat{V}_{1,a|b}^{body} = \hat{V}_{2,a|b}^{body}$, while $\hat{V}_{1,a|b}^{NED} \neq \hat{V}_{2,a|b}^{NED}$. Now there are four equations and four unknowns and the system of equations is solvable.

3. It may be that $\hat{V}_{1,a|b}^{body} \neq \hat{V}_{2,a|b}^{body}$ because the swimmer 110 has changed speed as well as direction. The system may be solvable by assuming that a proportionality exists between $\hat{V}_{a|b}$ and $\hat{V}_{b|w}$, that is $\hat{V}_{a|b} = \beta \cdot \hat{V}_{b|w}$. $\hat{V}_{a|b}$ can be solved for each epoch using the previously-discussed techniques, where β is a transformation matrix that only carries two unique elements: a scale factor and an angular offset (this was the a priori model assumed in method (1)). Both terms are assumed to be constant. Consequently, we are now solving for the vector of constants which describe the arm-to-body velocity relative to the body-to-water velocity rather than the arm-to-body velocity itself. Therefore, this system of equations is again solvable.

The processor 30 may be configured to determine a velocity $\hat{V}_{b|e}$ or speed (i.e., without direction) of the swimmer 110 relative to the water. For example, the processor 30 may use the determined velocity of the swimmer 110 relative to Earth and the determined velocity of the current to determine the velocity of the swimmer 110 relative to the water. The processor 30 may subtract the velocity of the current ($\hat{V}_{w|e}$) from the determined body-to-Earth velocity $\hat{V}_{b|e}$ to yield the velocity of the swimmer 110 relative to the water ($\hat{V}_{b|w}$) (e.g., may subtract the water vector 124 from the body-to-Earth vector 120 to yield the body-to-water vector 122). Also or alternatively, the processor 30 may use input from the user as to the swimmer's arm length and swim style, or typical distance per stroke, to determine speed relative to the water. The processor 30 may use input from one or more of the sensors 36, e.g., a pressure sensor, one or more accelerometers, and/or one or more gyroscopes, to determine a stroke frequency of the swimmer 110. The processor 30 may multiply the stroke frequency by a distance per stroke (e.g., determined from the input arm length and swim stroke (with possibly one or more assumptions, e.g., an open/cupped hand used by the swimmer 110), or a stroke distance input by the user, etc.) to determine speed of the swimmer 110 relative to the water. The processor 30 may compare the speed estimated by multiplying distance per stroke by stroke frequency with the speed estimated by subtracting the water current velocity from the arm-to-Earth velocity $V_{a|e}$, and may take action if the difference exceeds a threshold. Examples of actions that the processor 30 may take include ignoring one or both speed determinations (e.g., not reporting either speed to a user), and adjusting one or more parameters (e.g., the value a and/or the distance per stroke).

Operation

Figure 9:
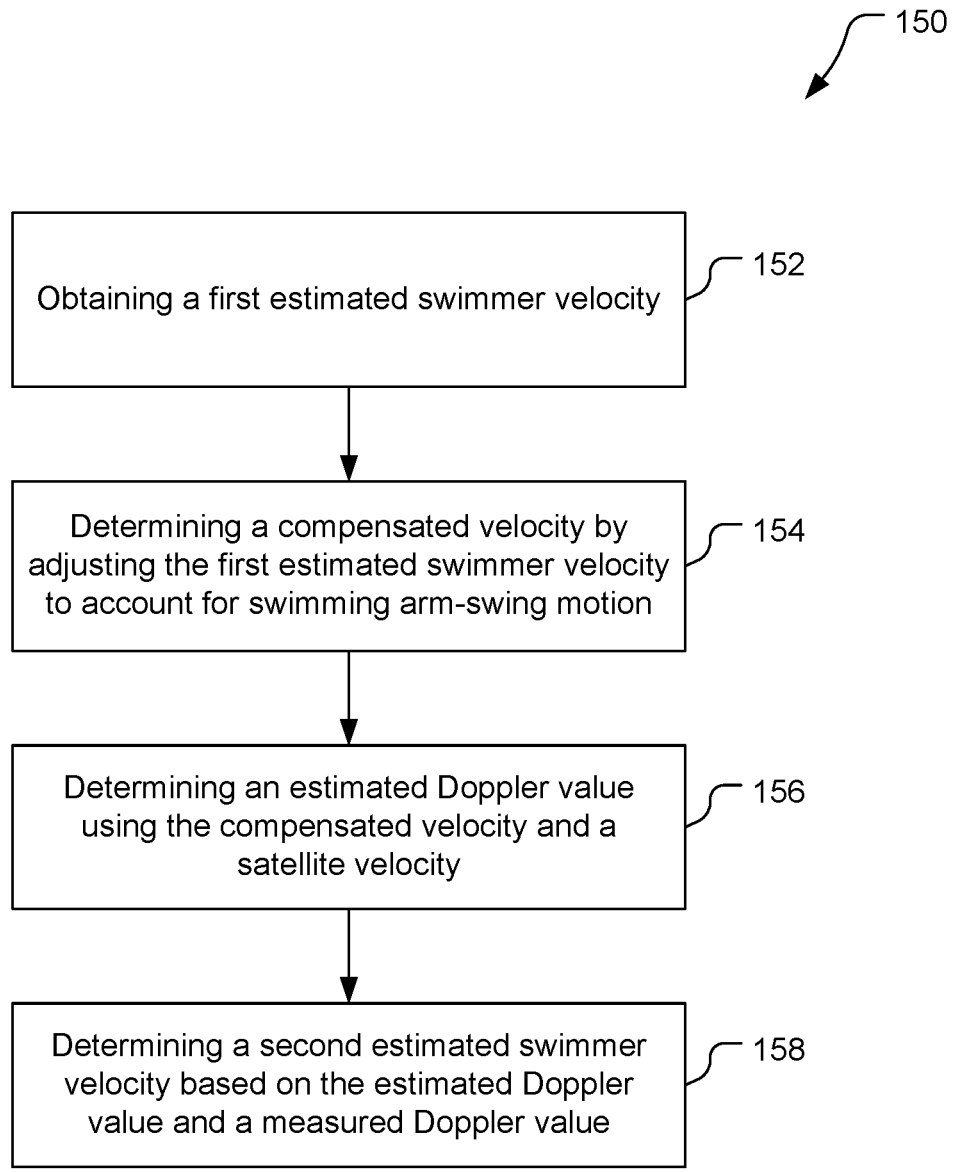
FIG. 9 is a block flow diagram of a method of determining a velocity of the swimmer shown in FIG. 5.

Referring to FIG. 9, with further reference to FIGS. 1-6, a method 150 of determining a velocity of a swimmer using a mobile device includes the stages shown. The method 150 is, however, an example only and not limiting. The method 150 may be altered, e.g., by having stages added, removed, rearranged, combined, performed concurrently, and/or having single stages split into multiple stages.

At stage 152, the method 150 includes obtaining a first estimated swimmer velocity. For example, for an initial determination (such as, for example, a first estimation) of the velocity (e.g., after a reset) of the swimmer, the processor 30 may use a default estimated velocity of the swimmer (e.g., programmed into the processor, or stored in the memory 32, etc.). The default may be any of a variety of velocities, e.g., any of a variety of speeds (e.g., zero, one, or some other non-zero value) and a default direction, e.g., north. As another example, such as for subsequent (after the initial) determination of the velocity of the swimmer, the processor 30 may use a previously-determined velocity of the swimmer, such as the most-recently determined velocity of the swimmer as determined by the method 150. The processor 30 may obtain this velocity from, e.g., the memory 32 or from the processor 30 itself (e.g., being fed back from a determination output as an input). The processor 30 may determine a speed of the mobile device 12, e.g., using SPS-based calculations, telecommunication signal calculations, sensor-measurement-based calculations, etc. Means for performing the functionality of stage 152 may, but not necessarily, include, for example, the SPS antenna 44, the SPS unit 42, the memory 32, the sensor(s) 36, and/or the processor 30 with reference to FIG. 2.

At stage 154, the method 150 includes determining a compensated velocity by adjusting the first estimated swimmer velocity to account for swimming arm-swing motion. For example, this may include the processor 30 determining a scale factor as discussed above and multiplying the estimated velocity of the swimmer by the scale factor to determine the compensated velocity. The processor 30 may determine a value of the scale factor based on a speed of the mobile device 12 (which may be determined in any of a variety of manners as discussed above). The stage 154 may include the processor 30 determining whether the speed of the mobile device 12 is above a threshold. The processor 30 may determine the compensated velocity in response to the speed of the mobile device 12 being above the threshold. Means for performing the functionality of stage 154 may, but not necessarily, include, for example, the memory 32, the sensor(s) 36, and/or the processor 30 with reference to FIG. 2.

At stage 156, the method 150 includes determining an estimated Doppler value using the compensated velocity and a satellite velocity. For example, the processor 30 may determine the estimated Doppler value according to Equation (2) discussed above. The satellite velocity may be obtained by the processor 30 accessing satellite information stored in the memory 32. Means for performing the functionality of stage 156 may, but not necessarily, include, for example, the memory 32, and/or the processor 30 with reference to FIG. 2.

At stage 158, the method 150 includes determining a second estimated swimmer velocity based on the estimated Doppler value and a measured Doppler value. For example, the processor 30 may determine a difference between the estimated Doppler value and the measured Doppler value and use this to determine a new, revised estimate of the swimmer velocity using known techniques. Means for performing the functionality of stage 158 may, but not necessarily, include, for example, the SPS antenna 44, the SPS unit 42, the memory 32, the sensor(s) 36, and/or the processor 30 with reference to FIG. 2.

The method 150 may include one or more other features. For example, the method 150 may include determining, e.g., by the processor 30, a velocity of a water current in which the user is disposed. The processor 30 (and/or other device(s)) may, for example, determine the velocity of the water current by comparing an expected travel distance and an expected travel direction with an actual (measured) travel distance and an actual (measured) travel direction. Still other features may be included in the method 150.

Figure 10:
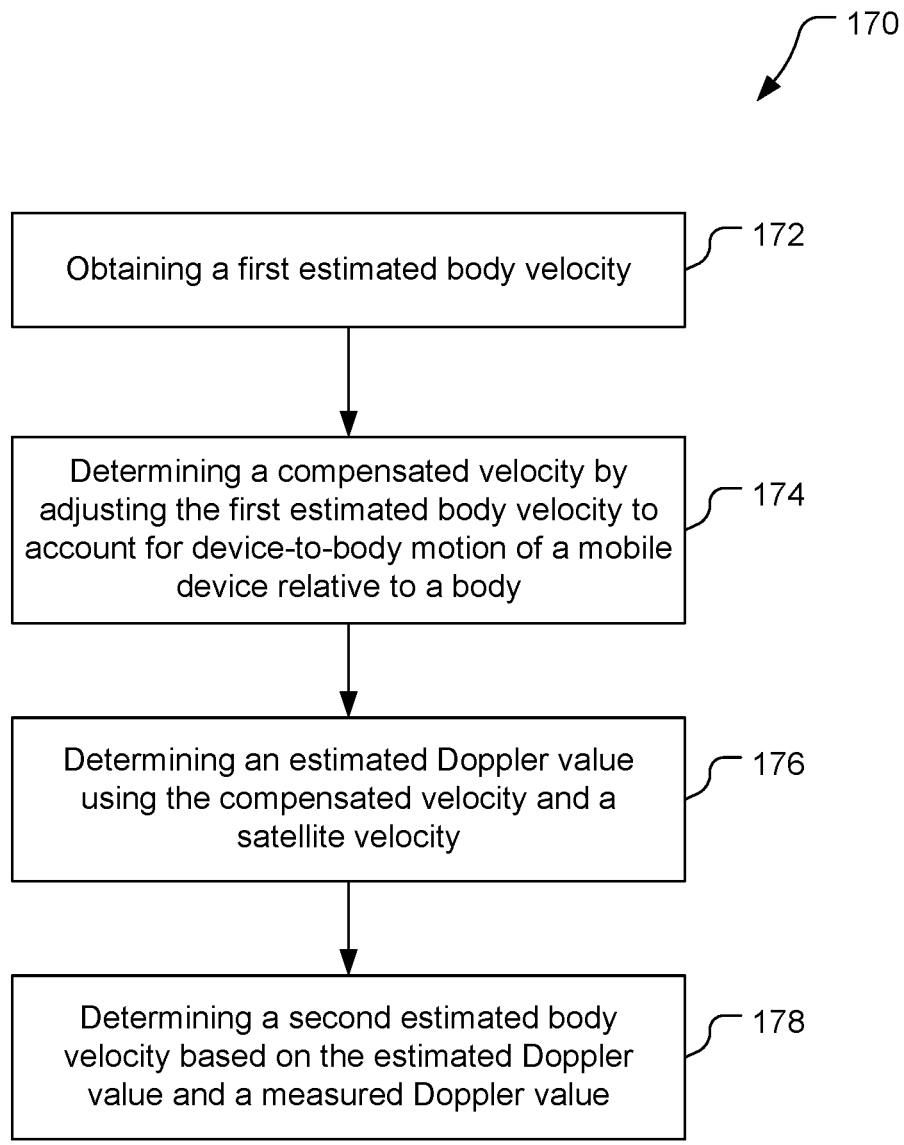
FIG. 10 is another block flow diagram of a method of determining a velocity of the swimmer shown in FIG. 5.

Referring to FIG. 10, with further reference to FIGS. 1-6, a method 170 of determining a velocity of a user of a mobile device includes the stages shown. The method 170 is, however, an example only and not limiting. The method 170 may be altered, e.g., by having stages added, removed, rearranged, combined, performed concurrently, and/or having single stages split into multiple stages.

At stage 172, the method 170 includes obtaining a first estimated body velocity. For example, the stage 172 may be similar to the stage 152 discussed above. Means for performing the functionality of stage 172 may, but not necessarily, include, for example, the SPS antenna 44, the SPS unit 42, the memory 32, the sensor(s) 36, and/or the processor 30 with reference to FIG. 2.

At stage 174, the method 170 includes determining a compensated velocity by adjusting the first estimated body velocity to account for a device-to-body motion of a mobile device relative to a body. Device-to-body motion may, for example, be motion of the SPS antenna 44 and/or the telecom antenna 40 and/or the sensor(s) 36 relative to the body (e.g., a torso) of the swimmer 110, with the device-to-body motion being, e.g., due to the swimmer 110 wearing the mobile device 12 (e.g., a wristwatch) while swimming. Due to swimming, the mobile device 12, and thus the antenna(s) 40, 44 and the sensor(s) 36 move relative to the body of the swimmer 110, with the antenna-to-body motion possibly including repetitive and non-repetitive motion. The stage 174 may, for example, include the processor 30 determining a scale factor as discussed above and multiplying the first estimated body velocity by the scale factor to determine the compensated velocity. The processor 30 may determine a value of the scale factor based on a speed of the mobile device 12 (which may be determined in any of a variety of manners as discussed above). The stage 174 may include the processor 30 determining whether the speed of the mobile device 12 is above a threshold. The processor 30 may determine the compensated velocity in response to the speed of the mobile device 12 being above the threshold. Means for performing the functionality of stage 174 may, but not necessarily, include, for example, the memory 32, the sensor(s) 36, and/or the processor 30 with reference to FIG. 2.

At stage 176, the method 170 includes determining an estimated Doppler value using the compensated velocity and a satellite velocity. For example, the processor 30 may determine the estimated Doppler value according to Equation (2) discussed above. The satellite velocity may be obtained by the processor 30 accessing satellite information stored in the memory 32. Means for performing the functionality of stage 176 may, but not necessarily, include, for example, the memory 32, and/or the processor 30 with reference to FIG. 2.

At stage 178, the method 170 includes determining a second estimated body velocity based on the estimated Doppler value and a measured Doppler value. For example, the processor 30 may determine a difference between the estimated Doppler value and the measured Doppler value and use this to determine a new, revised estimate of the user velocity using known techniques. Means for performing the functionality of stage 178 may, but not necessarily, include, for example, the SPS antenna 44, the SPS unit 42, the memory 32, the sensor(s) 36, and/or the processor 30 with reference to FIG. 2.

The method 170 may include one or more other features. For example, the method 170 may include determining, e.g., by the processor 30, an estimated velocity of a water current (i.e., an estimated water current velocity) in which the body is disposed. The processor 30 (and/or other device(s)) may, for example, determine the velocity of the water current by comparing an expected travel distance and an expected travel direction with an actual (measured) travel distance and an actual (measured) travel direction. Still other features may be included in the method 170.

Other Considerations

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "mobile wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific implementations. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Various terms as used herein in the plural include the singular, and as used herein in the singular include the plural. The terms "sensors" and "actions" were specifically mentioned above, but this list is not exhaustive and other terms may be used in the singular or plural but include the plural and the singular, respectively.

Further, more than one invention may be disclosed.

What is claimed is:

1. A mobile device comprising:
   a memory; and
   a processor communicatively coupled to the memory and configured to:
   obtain a first estimated body velocity;
   determine a compensated velocity by adjusting the first estimated body velocity to account for a device-to-body motion of the mobile device relative to a body;

determine an estimated Doppler value using the compensated velocity and a satellite velocity; and determine a second estimated body velocity based on the estimated Doppler value and a measured Doppler value.

2. The mobile device of claim 1, wherein to determine the compensated velocity, the processor is configured to multiply the first estimated body velocity by a scale factor.

3. The mobile device of claim 2, wherein the processor is configured to determine the compensated velocity of the body in response to a speed of the mobile device being above a threshold.

4. The mobile device of claim 3, wherein the processor is configured to determine a value of the scale factor based on the speed of the mobile device.

5. The mobile device of claim 1, wherein the processor is further configured to determine an estimated water current velocity of a water current.

6. The mobile device of claim 5, wherein the processor is configured to determine the estimated water current velocity by comparing an expected travel distance and an expected travel direction with a measured travel distance and a measured travel direction.

7. The mobile device of claim 1, wherein the processor is configured to use a default velocity as the first estimated body velocity for an initial determination of the second estimated body velocity, and to use a previously-determined second estimated body velocity for the first estimated body velocity for subsequent determinations of the second estimated body velocity.

8. A method comprising:
obtaining a first estimated body velocity;
determining a compensated velocity by adjusting the first estimated body velocity to account for a device-to-body motion of a mobile device relative to a body;
determining an estimated Doppler value using the compensated velocity and a satellite velocity; and
determining a second estimated body velocity based on the estimated Doppler value and a measured Doppler value.

9. The method of claim 8, wherein determining the compensated velocity comprises multiplying the first estimated body velocity by a scale factor.

10. The method of claim 9, wherein determining the compensated velocity comprises determining whether a speed of the mobile device is above a threshold.

11. The method of claim 10, wherein adjusting the first estimated body velocity is performed in response to the speed of the mobile device being above the threshold.

12. The method of claim 11, further comprising determining a value of the scale factor based on the speed of the mobile device.

13. The method of claim 8, further comprising determining an estimated water current velocity of a water current in which the body is disposed.

14. The method of claim 13, wherein determining the estimated water current velocity comprises comparing an expected travel distance and an expected travel direction with a measured travel distance and a measured travel direction.

15. The method of claim 8, wherein determining the compensated velocity, determining the estimated Doppler value, and determining the second estimated body velocity are all performed by the mobile device.

16. The method of claim 8, wherein the first estimated body velocity comprises a previously-determined second estimated body velocity.

17. A non-transitory, processor-readable storage medium comprising processor-readable instructions configured to instruct a processor to:
obtain a first estimated body velocity;
determine a compensated velocity by adjusting the first estimated body velocity to account for a device-to-body motion of a mobile device relative to a body;
determine an estimated Doppler value using the compensated velocity and a satellite velocity; and
determine a second estimated body velocity based on the estimated Doppler value and a measured Doppler value.

18. The storage medium of claim 17, wherein the instructions configured to instruct the processor to determine the compensated velocity are configured to instruct the processor to multiply the first estimated body velocity by a scale factor.

19. The storage medium of claim 18, wherein the instructions configured to instruct the processor to determine the estimated velocity of the body are configured to instruct the processor to determine whether a speed of the mobile device is above a threshold.

20. The storage medium of claim 19, wherein the instructions configured to instruct the processor to determine the compensated velocity comprise instructions configured to instruct the processor to determine a value of the scale factor based on the speed of the mobile device.

21. The storage medium of claim 17, further comprising instructions configured to instruct the processor to determine an estimated water current velocity of a water current.

22. The storage medium of claim 21, wherein the instructions configured to instruct the processor to determine the estimated water current velocity are configured to instruct the processor to compare an expected travel distance and an expected travel direction with a measured travel distance and a measured travel direction.

23. The storage medium of claim 17, wherein the instructions configured to instruct the processor to determine the compensated velocity are configured to instruct the processor to use a default velocity as the first estimated body velocity for an initial determination of the second estimated body velocity, and to use a previously-determined second estimated body velocity for the first estimated body velocity for subsequent determinations of the second estimated body velocity.

24. A mobile device comprising:
means for obtaining a first estimated body velocity;
means for determining a compensated velocity by adjusting the first estimated body velocity to account for a device-to-body motion of the mobile device relative to a body;
means for determining an estimated Doppler value using the compensated velocity and a satellite velocity; and
means for determining a second estimated body velocity based on the estimated Doppler value and a measured Doppler value.

25. The mobile device of claim 24, wherein the means for determining the compensated velocity are for multiplying the first estimated body velocity by a scale factor.

26. The mobile device of claim 25, wherein the means for determining the estimated velocity of the body comprise means for determining whether a speed of the mobile device is above a threshold.

27. The mobile device of claim 26, wherein the means for determining the compensated velocity comprise means for determining a value of the scale factor based on the speed of the mobile device.

28. The mobile device of claim 24, further comprising means for determining an estimated water current velocity of a water current in which the body is disposed.

29. The mobile device of claim 28, wherein the means for determining the estimated water current velocity comprise means for comparing an expected travel distance and an expected travel direction with a measured travel distance and a measured travel direction.

30. The mobile device of claim 24, wherein the means for obtaining the first estimated body velocity are configured to use a default value as the first estimated body velocity for an initial determination of the second estimated body velocity, and to use a previously-determined value of the second estimated body velocity for the first estimated body velocity for subsequent determinations of the second estimated body velocity.

* * * * *